United States Patent
Podszus

(10) Patent No.: US 9,295,120 B2
(45) Date of Patent: Mar. 22, 2016

(54) LED LIGHTING APPARATUS

(71) Applicant: Diehl Aerospace GmbH, Ueberlingen (DE)

(72) Inventor: Rainer Podszus, Neunkirchen (DE)

(73) Assignee: Diehl Aerospace GmbH, Ueberlingen (DE)

( * ) Notice: Subject to any disclaimer, the term of this patent is extended or adjusted under 35 U.S.C. 154(b) by 0 days.

(21) Appl. No.: 14/730,409

(22) Filed: Jun. 4, 2015

(65) Prior Publication Data

US 2015/0359055 A1   Dec. 10, 2015

(30) Foreign Application Priority Data

Jun. 7, 2014   (DE) .......................... 10 2014 008 421

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC .................................. H05B 33/0815 (2013.01)

(58) Field of Classification Search
None
See application file for complete search history.

(56) References Cited

U.S. PATENT DOCUMENTS

| | | |
|---|---|---|
| 2006/0038661 A1 | 2/2006 | Reinhold et al. |
| 2007/0073449 A1 | 3/2007 | Kraemer et al. |
| 2009/0052315 A1 | 2/2009 | Kollner et al. |
| 2011/0316449 A1* | 12/2011 | Imanaka ....................... 315/307 |
| 2012/0181950 A1* | 7/2012 | Yu et al. ........................ 315/294 |

FOREIGN PATENT DOCUMENTS

| | | |
|---|---|---|
| DE | 10335904 A1 | 2/2005 |
| DE | 102004026468 A1 | 12/2005 |
| DE | 102005060025 A1 | 6/2007 |
| EP | 1113708 A2 | 7/2001 |
| WO | WO 2011/067177 A1 | 6/2011 |

* cited by examiner

*Primary Examiner* — Anh Tran
(74) *Attorney, Agent, or Firm* — Scully Scott Murphy and Presser; Frank Digiglio

(57) ABSTRACT

The invention relates to an LED lighting apparatus comprising
  a control module having a push-pull circuit for generating a pulse-width-modulated (PWM) signal,
  an LED lighting module which is connected to the control module via a signal transmission path, which is intended to transmit the PWM signal to a signal converter accommodated in the LED lighting module, and to a current source, the brightness of at least one LED being controlled using the signal converter on the basis of the PWM signal received thereby, the LED lighting module also containing a device for generating a detector current having a predefined level, and
  a measuring circuit for measuring the instantaneous level of the detector current being connected in the control module in such a manner that, during the switched-off times of the PWM signal, the measuring circuit is connected to the LED lighting module via the signal transmission path such that the instantaneous level of the detector current can be measured using the measuring circuit and a functional state of the LED lighting module can be determined therefrom.

10 Claims, 1 Drawing Sheet

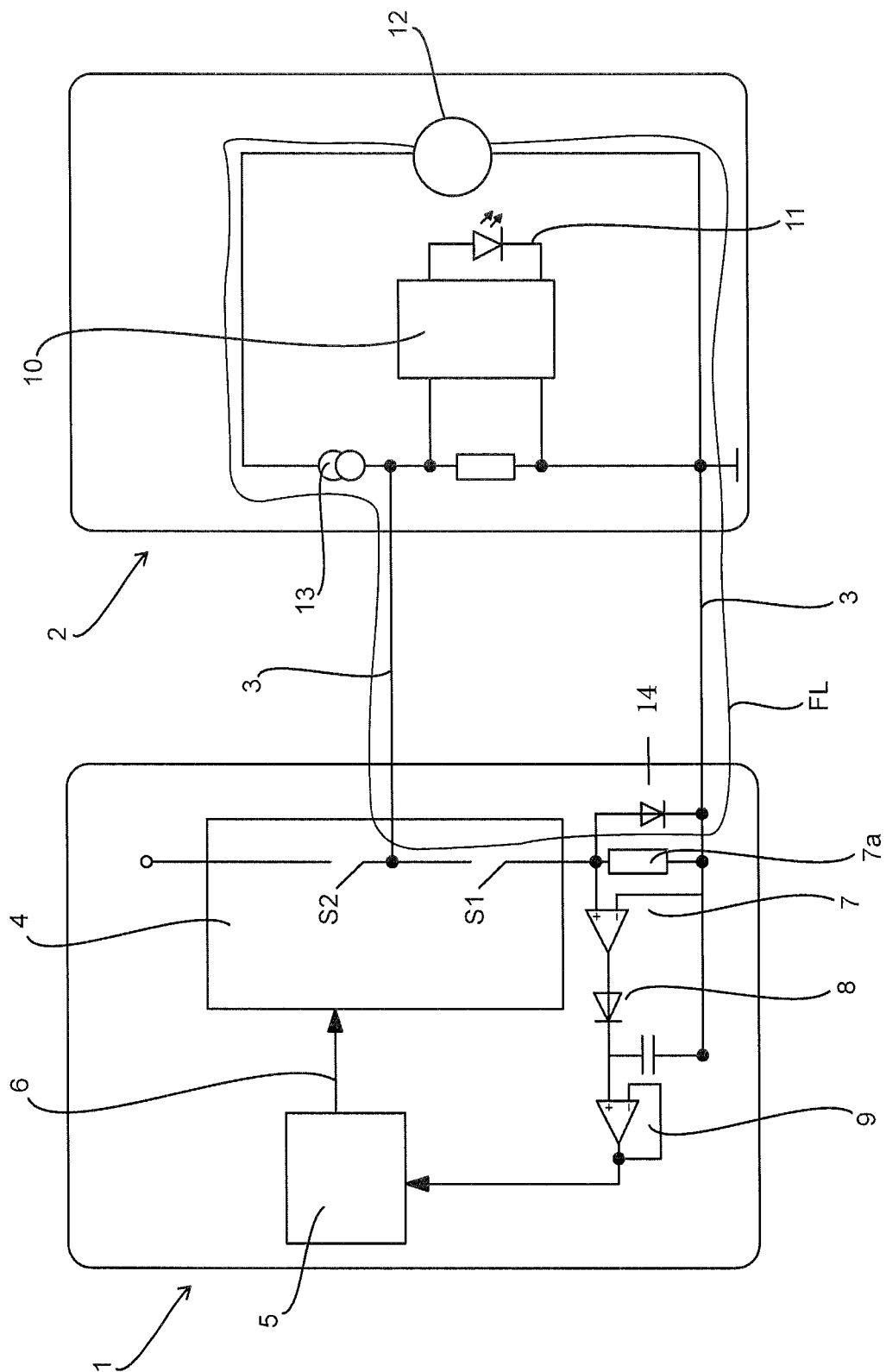

LED LIGHTING APPARATUS

BACKGROUND OF THE INVENTION

The invention relates to an LED lighting apparatus, in particular an LED lighting apparatus for connection to a vehicle electrical system of a passenger aircraft.

DISCUSSION OF THE PRIOR ART

According to the prior art, LED lighting modules are installed in passenger aircraft. Such LED lighting modules usually comprise a printed circuit board which accommodates a plurality of LEDs and a signal converter. The LED lighting module is connected to the vehicle electrical system of the passenger aircraft in order to supply the LEDs with current. The signal converter is connected to a control module via a signal transmission path. A pulse-width-modulated (PWM) signal which codes a predefined luminous intensity of the LEDs is generated in the control module. The PWM signal is received by the signal converter. A current for supplying the LEDs is controlled on the basis of the received PWM signal. It is therefore possible to control the brightness of the LEDs and therefore to dim the latter.

The control module is connected to a central on-board computer via a data bus. The PWM signals are generated using the control module on the basis of corresponding control data received via the data bus. A control module is usually designed in such a manner that it can be used to control a multiplicity of LED lighting modules.

The LEDs, in particular, and the electronics controlling the latter in the LED lighting modules have a limited service life. It is necessary to check the functionality of the LED lighting modules at regular intervals. For this purpose, a visual check was previously used to check whether the LEDs in the lighting modules are functioning. This is time-consuming and is not always reliably possible.

SUMMARY OF THE INVENTION

The object of the invention is to eliminate the disadvantages according to the prior art. In particular, the intention is to specify an LED lighting apparatus which makes it possible to check a functional state of an LED lighting module in a simplified manner.

The invention proposes an LED lighting apparatus comprising:
  a control module having a push-pull circuit for generating a pulse-width-modulated (PWM) signal,
  an LED lighting module which is connected to the control module via a signal transmission path, which is intended to transmit the PWM signal to a signal converter accommodated in the LED lighting module, and to a voltage source, the brightness of at least one LED being controlled using the signal converter on the basis of the PWM signal received thereby, the LED lighting module also containing a device for generating a detector current having a predefined level, and
  a measuring circuit for measuring the instantaneous level of the detector current being connected in the control module in such a manner that, during the switched-off times of the PWM signal, the measuring circuit is connected to the LED lighting module via the signal transmission path such that the instantaneous level of the detector current can be measured using the measuring circuit and a functional state of the LED lighting module can be determined therefrom.

According to the invention, the PWM signal is generated in the control module using a push-pull circuit. A measuring circuit is also provided in the control module. Consequently, it is possible to connect the measuring circuit to the LED lighting module via the signal transmission path during the switched-off times of the PWM signal. According to the invention, the LED lighting module is provided with a device for generating a detector current having a predefined level. Consequently, the level of the detector current can be measured using the measuring circuit during the switched-off times of the PWM signal. In other words, the measuring circuit is therefore activated for the purpose of measuring the detector current during the switched-off times of the PWM signal. A functional state of the LED lighting module can be inferred from the instantaneous level of the detector current: if no detector current is recorded using the measuring circuit, for example, it can be inferred that the LED lighting module is not functioning. It can be inferred from an instantaneous level of the detector current deviating from the predefined level of the detector current that an LED in the LED lighting module is defective, for example.

The signal transmission path has precisely two lines. That is to say, conventional signal transmission paths can be used to implement the LED lighting apparatus according to the invention. It is consequently also possible to equip or retrofit passenger aircraft having conventional signal transmission paths with the LED lighting apparatus according to the invention, for example. There is no need to lay and/or provide special signal transmission paths for this purpose.

According to one advantageous refinement, a duty cycle of the PWM signal is limited to a maximum value of less than 100%, with the result that the PWM signal always has switched-off times. For example, the maximum value may be in the range of 90 to 99%, preferably in the range of 95 to 98%. It is therefore possible to continuously monitor the functional state of the LED lighting module in all operating states.

The duty cycle DC of a PWM signal is understood as meaning the ratio of the switched-on time $t_{on}$ to the sum of the switched-on time $t_{on}$ and the switched-off time $t_{off}$. The following applies:

$$DC = t_{on}/(t_{on}+t_{off}) \text{ in } [\%].$$

According to one advantageous refinement, the signal converter is set in such a manner that the LED is supplied with a predefined maximum current when the maximum value of the PWM signal is present. For example, the signal converter can interpret the predefined maximum value of the PWM signal as a PWM signal having a duty cycle of 100%. The situation in which the LED can be operated with maximum brightness even in the case of a PWM signal containing switched-off times can therefore advantageously be achieved. There are no restrictions with respect to the brightness of the LED to be set.

According to one refinement, the detector current is recorded using the measuring circuit across a measuring resistor. The measuring resistor is expediently a low-impedance electrical resistor for measuring the electrical current. The measuring circuit expediently comprises a comparator and a sample-and-hold element for evaluating the detector current. The sample-and-hold element is used to convert the signal provided by the comparator into a continuous signal which is advantageously used to interpret the functional state of the LED lighting module.

The device for generating the detector current expediently comprises a current source for generating a constant current. If the LED lighting module is provided with a voltage-stabilized voltage source, it is sufficient to provide a resistor in order to implement the device for generating a detector current in a simple refinement. Providing such a resistor requires little effort. The weight of a conventional LED lighting module is therefore increased only insignificantly, which is important, in particular, for use in passenger aircraft.

According to one particularly advantageous refinement, the predefined level of the detector current is selected on the basis of a type of the LED contained in the LED lighting module. For example, a first LED lighting module having at least one first LED for generating light with a high brightness and a second LED lighting module having second LEDs for generating light with a lower brightness may be provided. In this case, the device for generating a detector current is used to generate a first detector current having a first level in the first LED lighting module and to generate a second detector current having a second level in the second LED lighting module. In this case, the first and second levels of the respective detector current are different from one another. If the first and second LED lighting modules are connected to the same control module, it is therefore possible to determine whether and possibly which of the two LED lighting modules is not functioning correctly on the basis of the recorded detector currents.

In another advantageous refinement, an overcurrent diode is connected in parallel with the measuring circuit. This makes it possible to operate a plurality of LED lighting modules with their own detector current in each case at a control module or PWM output.

BRIEF DESCRIPTION OF THE DRAWINGS

An exemplary embodiment of the invention is explained in more detail with reference to the accompanying drawing in which:

FIG. 1 is a schematic illustration of the LED lighting apparatus in accordance with the present invention.

DETAILED DESCRIPTION OF THE INVENTION

In FIG. 1, the reference symbol 1 is used to generally denote a control module and the reference symbol 2 is used to generally denote an LED lighting module. The control module 1 is connected to the LED lighting module 2 via a signal transmission path 3 which comprises two lines. In this case, a first line connects an output of the control module 1 to an input of the LED lighting module 2. A second line connects an input of the control module 1 to an output of the LED lighting module 2.

The control module 1 comprises a push-pull circuit 4 which is symbolized here by the two switches S1 and S2. The reference symbol 5 is used to denote a microcontroller which is connected in this case to the push-pull circuit 4 with DC isolation. However, such DC isolation is not required for the functional principle of the present invention. For the purpose of DC isolation, a data line 6 may be connected to the push-pull circuit 4 via an optocoupler (not shown here), for example. The reference symbol 7 is used to denote a measuring circuit which is connected to the switch S1 of the push-pull circuit 4. A measurement signal recorded by the measuring circuit 7 across a measuring resistor 7a is output to a sample-and-hold element 9 via an optocoupler 8.

The LED lighting module 2 comprises a signal converter 10 to which at least one LED 11 is connected. The reference symbol 12 is used to denote a voltage source for supplying the LED lighting module 2 with a constant voltage of 28 V, for example. The reference symbol 13 denotes a current source for generating a constant detector current.

The function of the LED lighting apparatus shown in the FIGURE is now explained in more detail.

On the basis of a data signal provided by the microcontroller 5, the push-pull circuit 4 generates a PWM signal, for example at a frequency of 300 Hz and with a duty cycle having a maximum value of 97%. The PWM signal is transmitted to the LED lighting module 2 via the signal transmission path 3. The PWM signal is decoded using the signal converter 10 and a current for supplying the LED 11 is provided on the basis of said signal. The maximum current is generated when the maximum value of the PWM signal is present.

The current source 13 which generates a constant detector current of 400 µA, for example, is provided for the purpose of monitoring a functional state of the LED lighting module 2. If the voltage source 12 is a stabilized voltage source, the current source 13 can be implemented by means of a resistor in a simple refinement.

A current path of the detector current is indicated by the freehand line FL. During the switched-off times of the PWM signal, the first switch S1 is closed and the second switch S2 is open in the push-pull circuit 4. Consequently, the detector current can be measured using the measuring circuit 7 across the measuring resistor 7a. An instantaneous level of the measured detector current is output to the sample-and-hold element 9 via the optocoupler 8. It can be evaluated and processed further in a conventional manner from there. The following functional states of the LED lighting module 2 can be detected, inter alia, using the proposed LED lighting apparatus:

Break of the signal transmission path 3
Function of the voltage source 12
Function and/or connection state of the LED 11

Depending on the design of the LED 11 used, the detector current can be set to a predefined specific level. When a plurality of LED lighting modules 2 are connected to one control module 1, it is possible to determine whether and possibly which of the different LED lighting modules 2 is not functioning correctly on the basis of the recorded level of the detector current.

An overcurrent diode 14 is connected in parallel with the measuring circuit 7 or the measuring resistor 7a. The overcurrent diode additionally accepts current if the voltage drop across the resistor 7a exceeds the forward voltage of the diode. As a result, it is also possible to operate a plurality of LED lighting modules 2 in a parallel manner at one control module 1, for example. In addition, the overcurrent diode 14 protects the measuring circuit 7 from overcurrent or overvoltage.

LIST OF REFERENCE SYMBOLS

1 Control module
2 LED lighting module
3 Signal transmission path
4 Push-pull circuit
5 Microcontroller
6 Data line
7 Measuring circuit
7a Measuring resistor
8 Optocoupler
9 Sample-and-hold element
10 Signal converter
11 LED
12 Voltage source
13 Current source
14 Overcurrent diode FL Freehand line
S1 First switch
S2 Second switch

What is claimed is:

1. An LED lighting apparatus comprising
a control module having a push-pull circuit for generating a pulse-width-modulated (PWM) signal,
an LED lighting module which is connected to the control module via a signal transmission path, which comprises two lines and is intended to transmit the PWM signal to a signal converter accommodated in the LED lighting module, and to a current source, the brightness of at least one LED being controlled using the signal converter on the basis of the PWM signal received thereby, the LED lighting module also containing a device for generating a detector current having a predefined level, and
a measuring circuit for measuring the instantaneous level of the detector current being connected in the control module in such a manner that, during the switched-off times of the PWM signal, the measuring circuit is connected to the LED lighting module via the signal transmission path such that the instantaneous level of the detector current can be measured using the measuring circuit and a functional state of the LED lighting module can be determined therefrom.

2. The LED lighting apparatus according to claim 1, wherein a duty cycle of the PWM signal is limited to a maximum value of less than 100%, with the result that the PWM signal always has switched-off times.

3. The LED lighting apparatus according to claim 2, wherein the maximum value is in the range of 90 to 99%.

4. The LED lighting apparatus according to claim 2, wherein the maximum value is in the range of 95 to 98%.

5. The LED lighting apparatus according to claim 1, wherein the signal converter is set in such a manner that the LED is supplied with a predefined maximum current when the maximum value of the PWM signal is applied.

6. The LED lighting apparatus according to claim 1, wherein the detector current is recorded using the measuring circuit across a measuring resistor.

7. The LED lighting apparatus according to claim 1, wherein the measuring circuit comprises a comparator and a sample-and-hold element for evaluating the detector current.

8. The LED lighting apparatus according to claim 1, wherein the device for generating the detector current comprises a further current source for generating a constant current.

9. The LED lighting apparatus according to claim 1, wherein the predefined level of the detector current is selected on the basis of a type of the LED contained in the LED lighting module.

10. The LED lighting apparatus according to claim 1, wherein an overcurrent diode is connected in parallel with the measuring circuit.

* * * * *